US012702144B2

(12) United States Patent
Lazzarini et al.

(10) Patent No.: US 12,702,144 B2
(45) Date of Patent: Aug. 11, 2026

(54) MACHINE FOR PROCESSING LIQUID OR SEMI-LIQUID FOOD PRODUCTS

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 164 days.

(21) Appl. No.: 18/414,770

(22) Filed: Jan. 17, 2024

(65) Prior Publication Data

US 2024/0237671 A1 Jul. 18, 2024

(30) Foreign Application Priority Data

Jan. 17, 2023 (IT) ........................ 102023000000150

(51) Int. Cl.
*A23G 9/28* (2006.01)

(52) U.S. Cl.
CPC ...................................... *A23G 9/28* (2013.01)

(58) Field of Classification Search
CPC ... A23G 9/28; A23G 9/00; A23G 9/04; A23G 9/045; A23G 9/08; A23G 9/12; A23G 9/14; A23G 9/16; A23G 9/166; A23G 9/22; A23G 9/228; A23G 9/281; A23G 9/282; A23G 9/283; A23G 9/285; A23G 9/287; A47B 96/02; A47B 96/021; A47B 96/022; A47B 96/024; A47B 96/025; A47B 96/027; A47B 96/028; A47B 96/14; A47B 47/022; A47B 57/04; A47B 57/045
See application file for complete search history.

(56) References Cited

U.S. PATENT DOCUMENTS 4,364,666 A * 12/1982 Keyes ..................... B01F 35/92
366/182.1
2019/0070643 A1 * 3/2019 Wong .................... B08B 9/0328

* cited by examiner

*Primary Examiner* — Miguel A Diaz

(57) ABSTRACT

A machine for processing liquid or semi-liquid food products, includes: a frame including a front wall and a lateral wall; at least one container for containing the product to be processed; a stirrer mounted inside the container; a thermal treatment system, operatively connected to the container to heat the walls thereof; a dispenser connected to the container to allow extracting the product to be processed, the dispenser being mounted on the front wall of the frame. A supporting rod, having a longitudinal axis, is coupled to the lateral wall and movable in rotation about an axis perpendicular to the lateral wall, between a rest position and an operatively active position. A shelf is rotatably coupled to the supporting rod. The supporting rod supports the shelf. The shelf is movable in rotation about the longitudinal axis between an inoperative position and an operative position.

34 Claims, 7 Drawing Sheets

MACHINE FOR PROCESSING LIQUID OR SEMI-LIQUID FOOD PRODUCTS

This application claims priority to Utility Model Italian Patent Application 202023000000150 filed Jan. 17, 2023, the entirety of which is incorporated by reference herein.

This disclosure relates to a machine for processing (liquid and/or semi-liquid and/or semi-solid) food products.

More specifically, this innovation relates to machines for making and dispensing food products, such as, for example, ice creams, whipped cream, dessert creams, chocolate, yogurt, jams and the like.

Generally speaking, these machines comprise a container for containing the product to be processed, a stirrer mounted inside the container and used for mixing the product, and at least one dispensing tap mounted at the bottom of the front of the container.

Dispensing the product after a stage in its processing may require several minutes, particularly in the case of products with a thick consistency.

Consequently, it may be very tiring for an operator to hold a container to collect the product being dispensed, for example, a product that has to undergo further processing.

Known in the prior art are machines provided with ledges designed to support the container while it is being filled. Such ledges are, however, fixed and cumbersome.

In the trade, there is a need for a machine for processing food products which is versatile and which is capable of supporting the containers while they are being filled.

Another need is that for a machine for processing food products which takes up a minimum of space when there are no such containers being filled.

The aim of this disclosure is to provide a machine for processing liquid and/or semi-liquid food products which meets the above-mentioned needs.

In particular, the aim of this disclosure is to provide a machine for processing liquid and/or semi-liquid food products which is versatile and which, when filling a container by dispensing, is capable of supporting the container itself and, at the same time, takes up a minimum of space when there is no container being filled.

This aim is fully achieved by the machine of this disclosure, as characterized in the appended claims.

The technical features and advantages of the innovation are more apparent in the following description of a preferred but non-limiting embodiment of it.

The description refers to the accompanying drawings, which are also provided purely by way of non-limiting example and in which.

Figure 1:
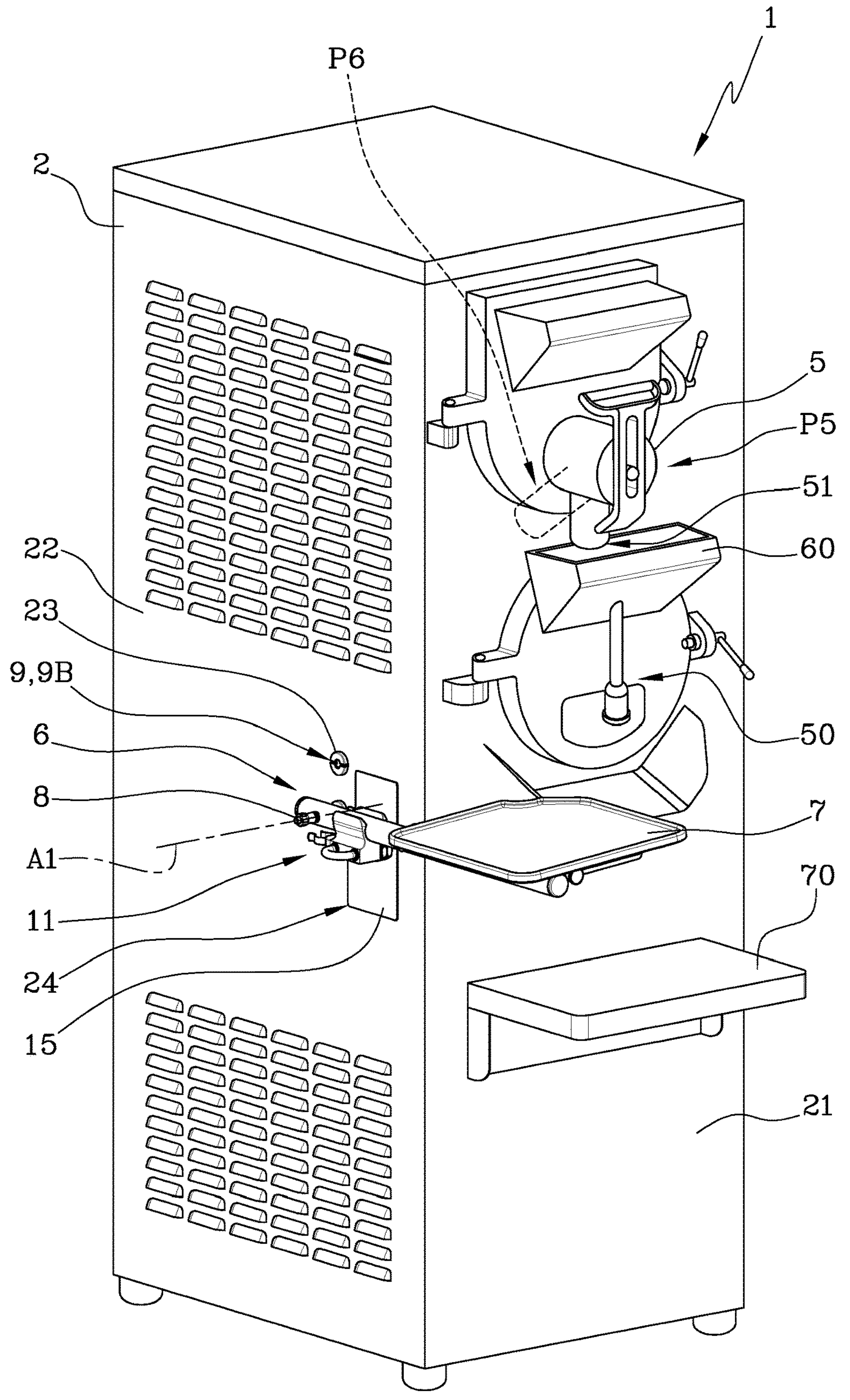
FIG. 1 shows a schematic perspective view of a machine according to this disclosure.
Figure 2:
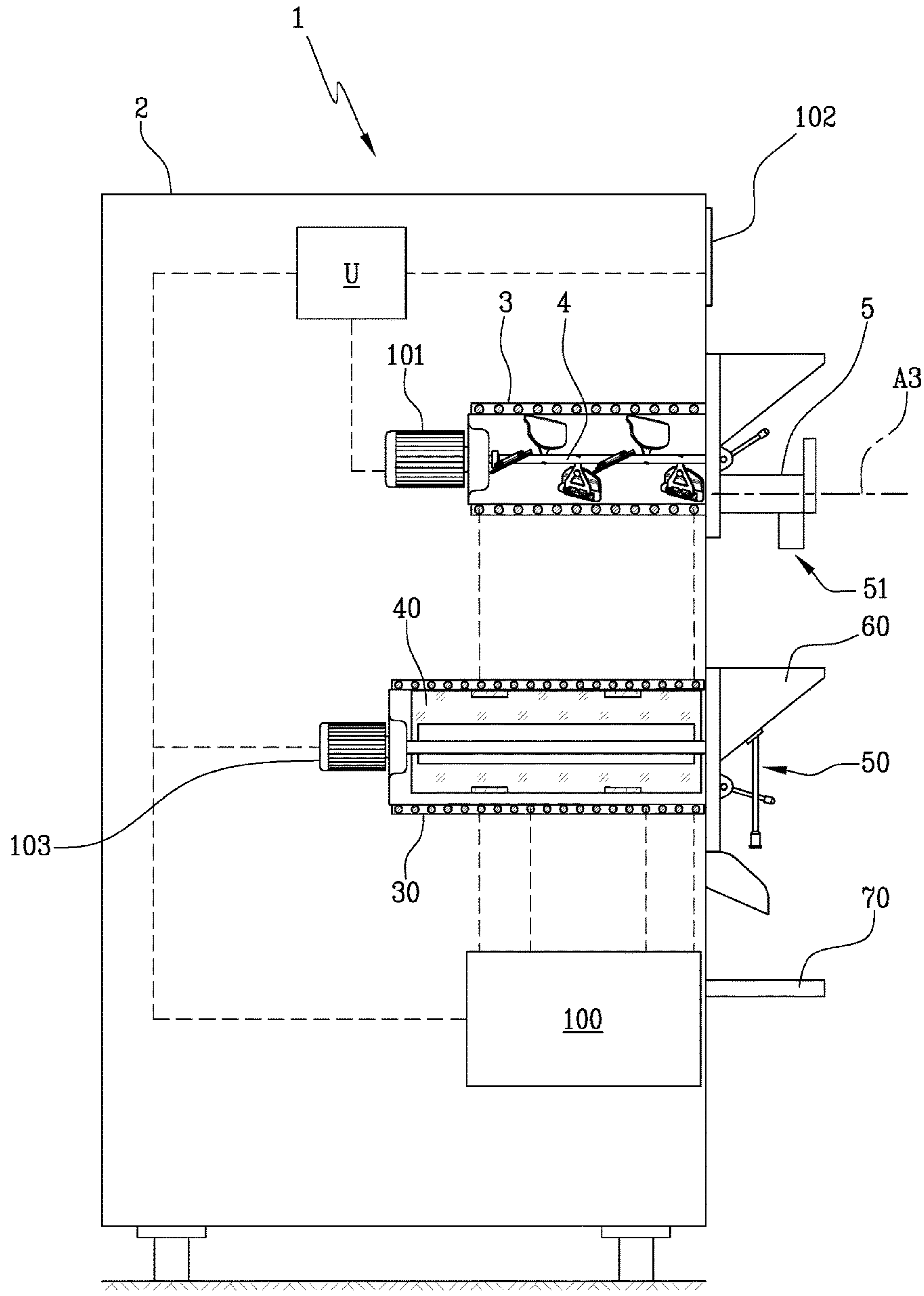
FIG. 2 shows a schematic cross sectional view of a machine according to this disclosure.

It should be noted that the drawings are schematic and are therefore not representative of the actual dimensions of the system.

With reference to the accompanying drawings, the numeral 1 denotes in its entirety a machine for processing liquid, or semi-liquid, or semi-solid food products, in particular for making, treating and dispensing the aforesaid food products.

For example, the food products may be ice creams, whipped cream, dessert creams, mixtures for cake and pastry fillings, chocolate, yogurt, jams or the like.

According to the disclosure, the machine 1 for processing liquid or semi-liquid products, hereinafter also referred to simply as "machine 1" for short, comprises a frame 2.

The frame 2 comprises at least a front wall 21 and a lateral wall 22.

In a preferred embodiment, as illustrated in FIG. 1, the front wall 21 and the lateral wall 22 are perpendicular to each other.

According to the disclosure, the machine 1 comprises at least one container 3, for containing the product to be processed.

The container 3 is located at least partly inside the frame 2.

The container 3 comprises lateral and bottom inside walls.

Preferably, the container 3 is a cylindrical container.

Still more preferably, the container 3 has a horizontal axis.

According to the disclosure, the machine 1 comprises at least one stirrer 4, mounted inside the container 3.

The stirrer 4 may be configured to mix products having a mainly liquid component, that is, liquid or semi-liquid products, and/or to mix predominantly thick products, that is, semi-solid products.

According to this disclosure, the machine 1 comprises a thermal treatment system 100.

Preferably, the thermal treatment system 100 is configured to heat the product inside the container 3.

Preferably, the thermal treatment system 100 is configured to heat the product inside the container 3 to a temperature of between 40° C. and 85° C.

The thermal treatment system 100 is associated with the container 3 to thermally treat the product contained therein.

In particular, the thermal system 100 is operatively connected to the container 3 to heat the walls thereof.

According to an aspect, the thermal treatment system 100 comprises at least one thermodynamic system (illustrated schematically in the accompanying drawings).

The thermodynamic system comprises a closed circuit configured to cause a heat exchanger fluid to circulate therein.

According to an aspect of this disclosure, the machine 1 comprises a control unit U.

The control unit U is configured to control the thermal treatment system 100.

According to an aspect of this disclosure, the machine 1 comprises a motor 101, configured to set the stirrer 4 in rotation about its axis of rotation.

The control unit U is configured to drive the motor 101.

In an embodiment, the machine 1 comprises an interface 102 which is operatively connected to the control unit U and is configured to allow interaction with a user.

According to the invention, the machine 1 comprises a dispenser 5, connected to the container 3 which contains the product to be processed to allow extracting the product to be processed.

The dispenser 5 is mounted on the front wall 21.

In other words, the product to be processed can be extracted from the front wall of the machine 1.

Preferably, the dispenser 5 comprises a control lever, configured to open or close a duct which is in communication with the interior of the container 3.

According to this disclosure, the machine 1 comprises a shelf 7 and a supporting rod 6. The supporting rod 6 is configured to support the shelf 7.

The supporting rod 6 is coupled to the lateral wall 22 of the frame 2 and is movable in rotation about an axis A1 between a rest position P1 and an operatively active position P2.

Figure 3:
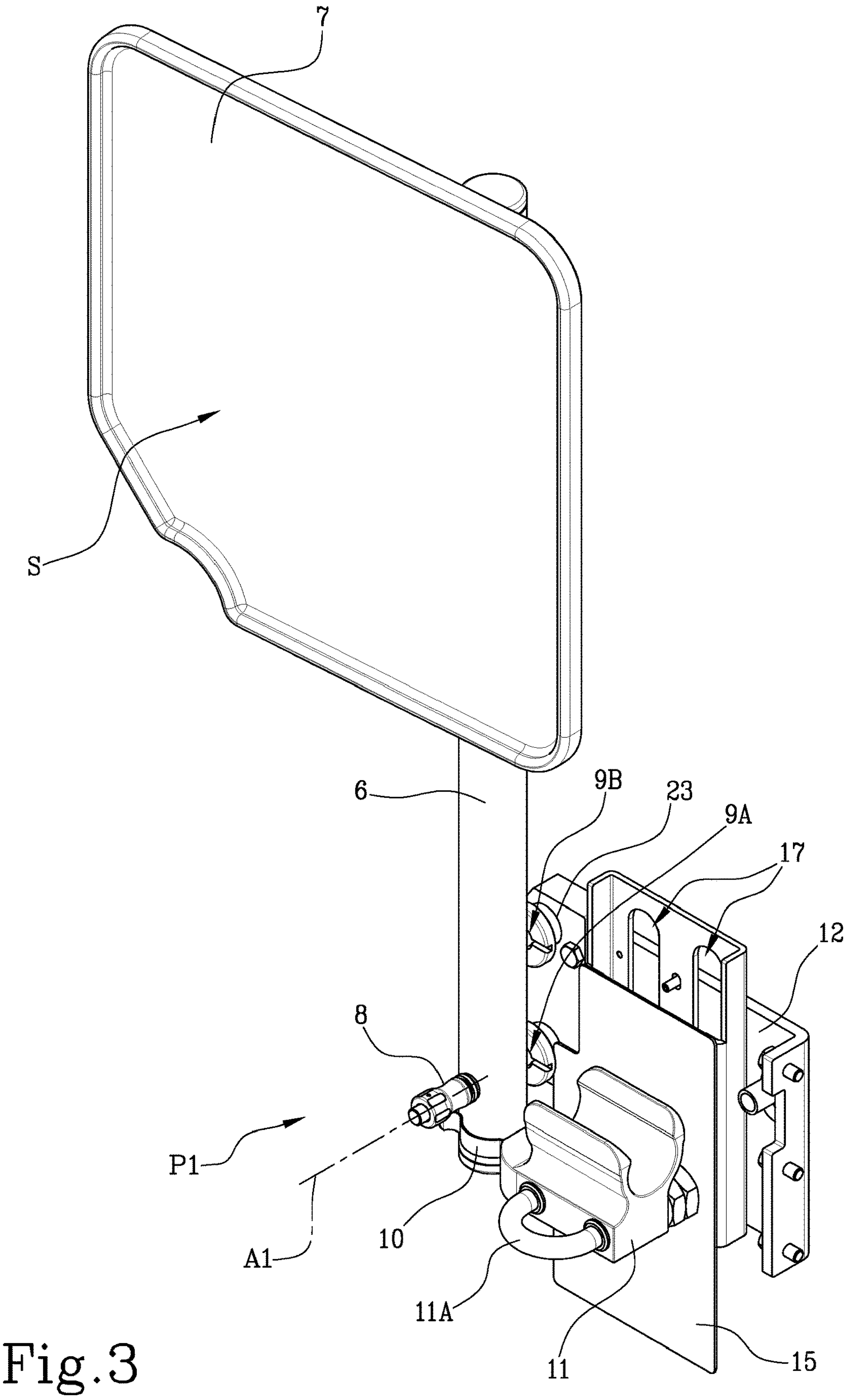
FIGS. 3, 4, 5 and 6 show schematic perspective views of a detail of the machine of FIG. 1 at different working positions.
Figure 4:
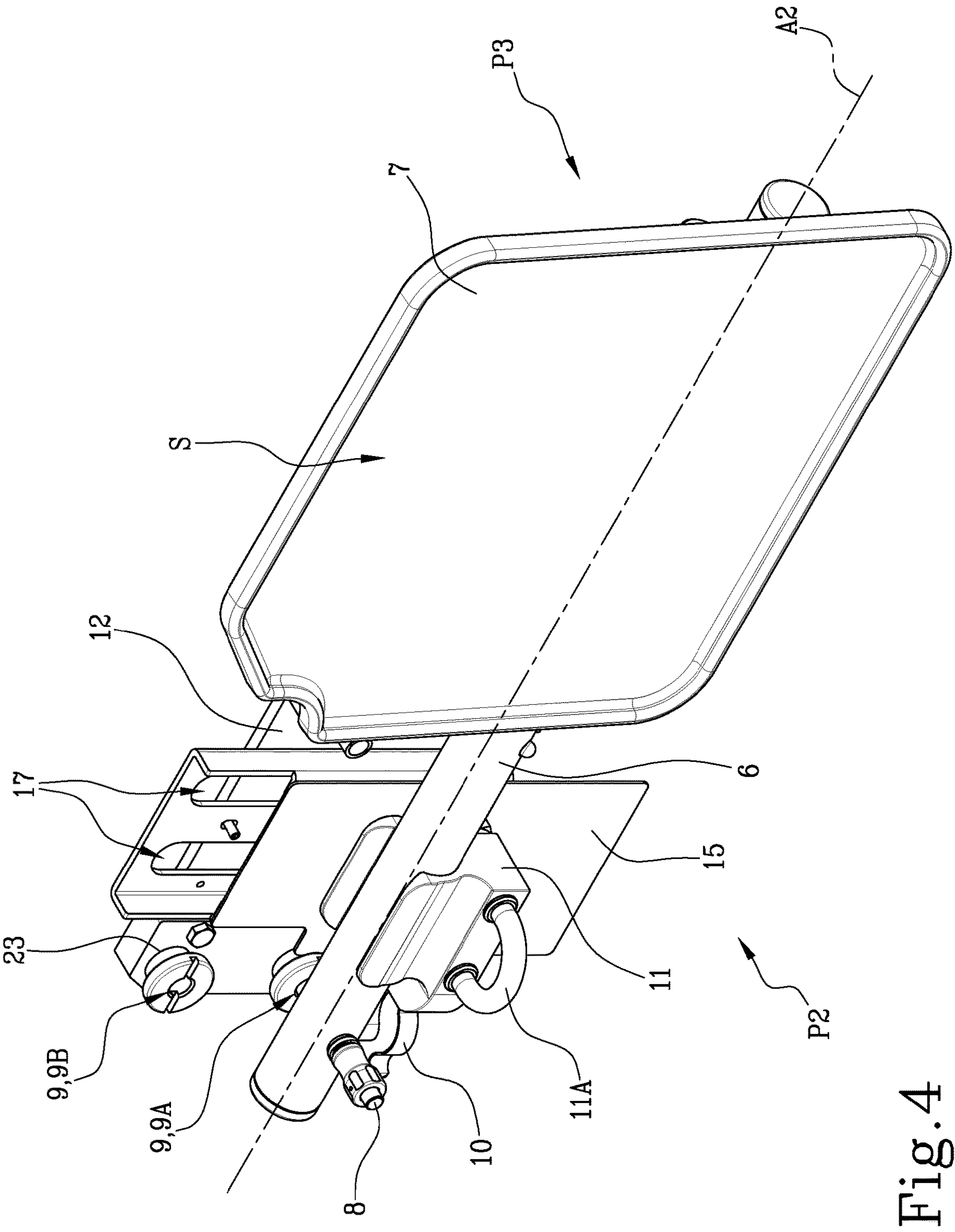

The rest position P1 of the supporting rod 6 is illustrated, for example, in FIG. 3, and the operatively active position P2 is illustrated, for example, in FIG. 4.

Preferably, the axis of rotation A1 is perpendicular to the lateral wall 22.

In other words, the supporting rod 6 preferably remains parallel to the lateral wall 22 as it rotates about the axis A1.

The supporting rod 6 has a longitudinal axis A2.

The shelf 7 is rotatably coupled to the supporting rod 6.

The shelf 7 is movable in rotation about the longitudinal axis A2 of the supporting rod 6 between an inoperative position P3 and an operative position P4.

Figure 5:
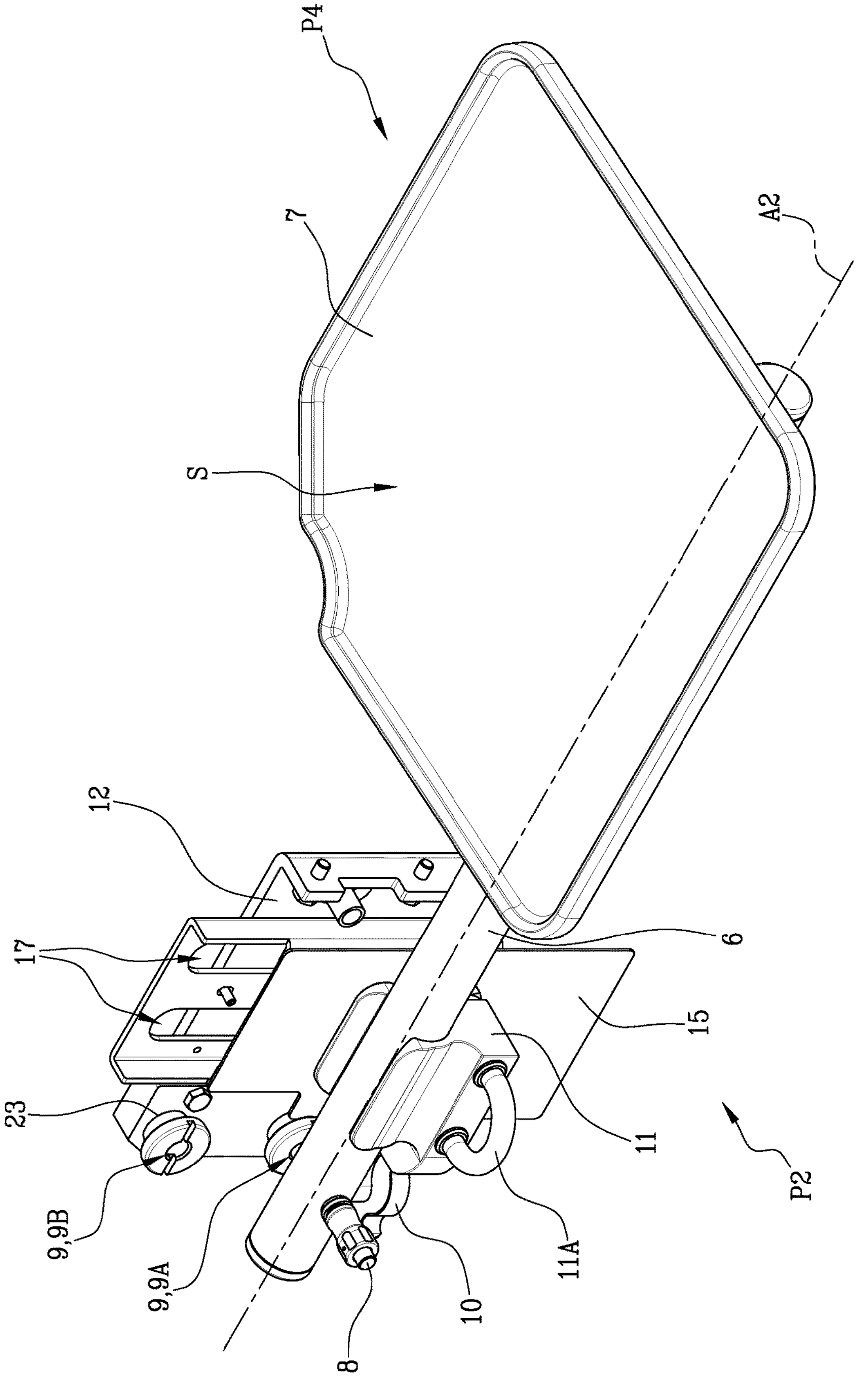

The inoperative position P3 of the shelf 7 is illustrated, for example, in FIG. 4, and the operative position P4 is illustrated, for example, in FIG. 5.

FIG. 1 shows the machine 1 with the supporting rod at the operatively active position P2 and the shelf at the operative position P4.

Advantageously, the shelf 7 allows supporting a weight, for example, a container used to collect the product being dispensed through the dispenser 5.

Advantageously, the supporting rod 6 and the shelf 7 being movable in rotation as described allow passing from an inoperative configuration to an operative configuration. By "operative configuration" is meant a configuration in which the shelf 7 is at a position where an operator can place a load on it. In particular, the load may be a container used for collecting the product dispensed through the dispenser 5.

According to an aspect of the disclosure, the supporting rod 6, when it is at the rest position P1, is configured to position the shelf 7 to face the lateral wall 22 of the frame 2.

According to an aspect of the disclosure, the supporting rod 6, when it is at the operatively active position P2, is configured to position the shelf 7 to face a region of space in front of the front wall 21 of the frame 2, as illustrated for example in FIG. 1.

Advantageously, this allows reducing the space occupied by the machine when the shelf 7 is not in use.

According to an aspect of the disclosure, the machine 1 comprises a pin 8.

The supporting rod 6 is movable in rotation about the pin 8 between the rest position P1 and the operatively active position P2.

In an embodiment, the lateral wall 22 of the frame 2 has at least one hole 9, 9A, 9B for receiving the pin 8.

In other words, the pin 8 couples the supporting rod 6 to the lateral wall 22 of the frame 2 and constitutes the fulcrum of rotation of the supporting rod 6.

In a preferred embodiment, the frame 2 comprises a first hole 9A and a second hole 9B.

The first and the second hole (9A, 9B) are intended for selectively receiving the pin 8 and are disposed respectively at a first height and at a second height, the second height being greater than the first height.

Figure 6:
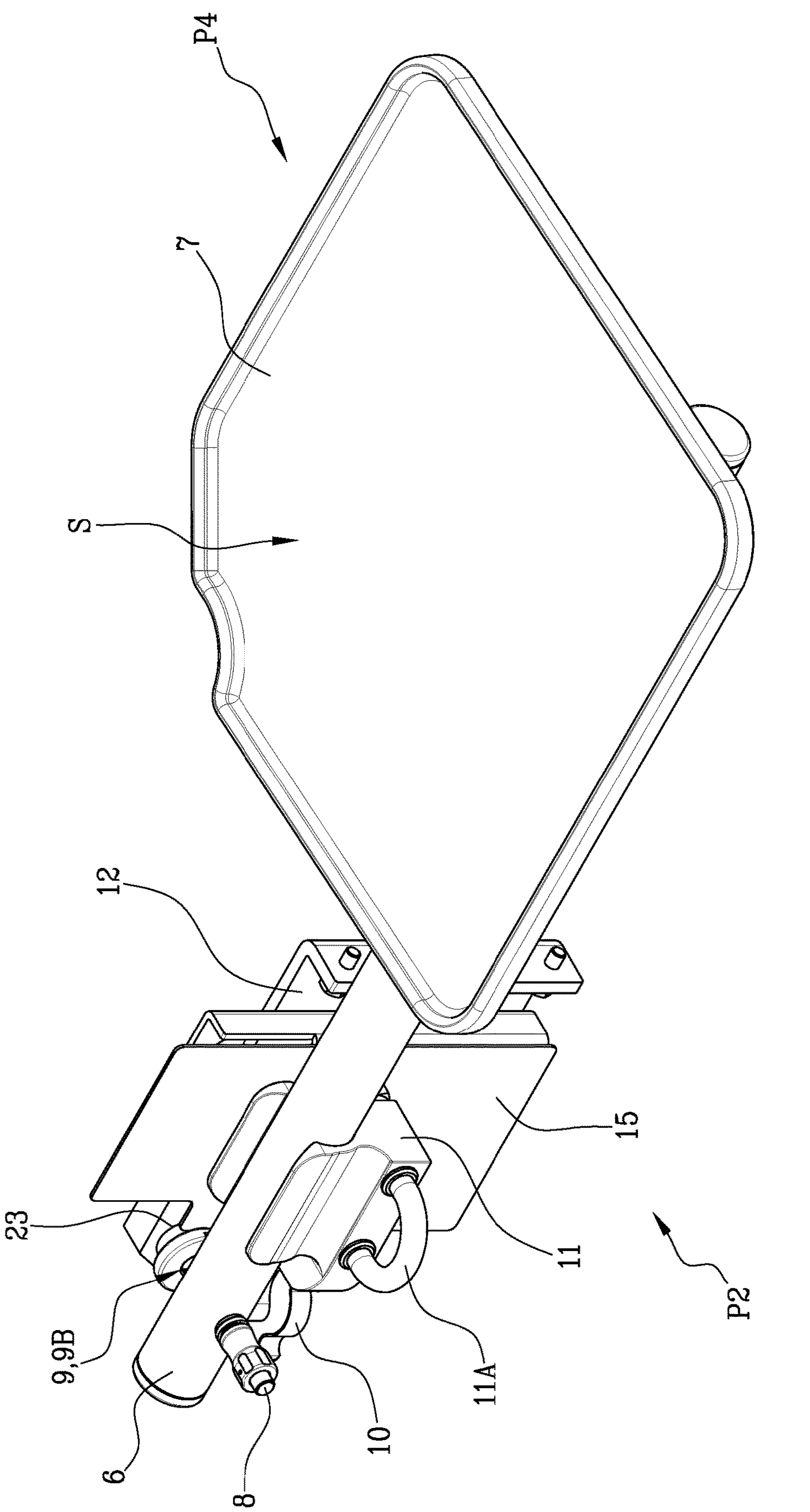
Figure 7:
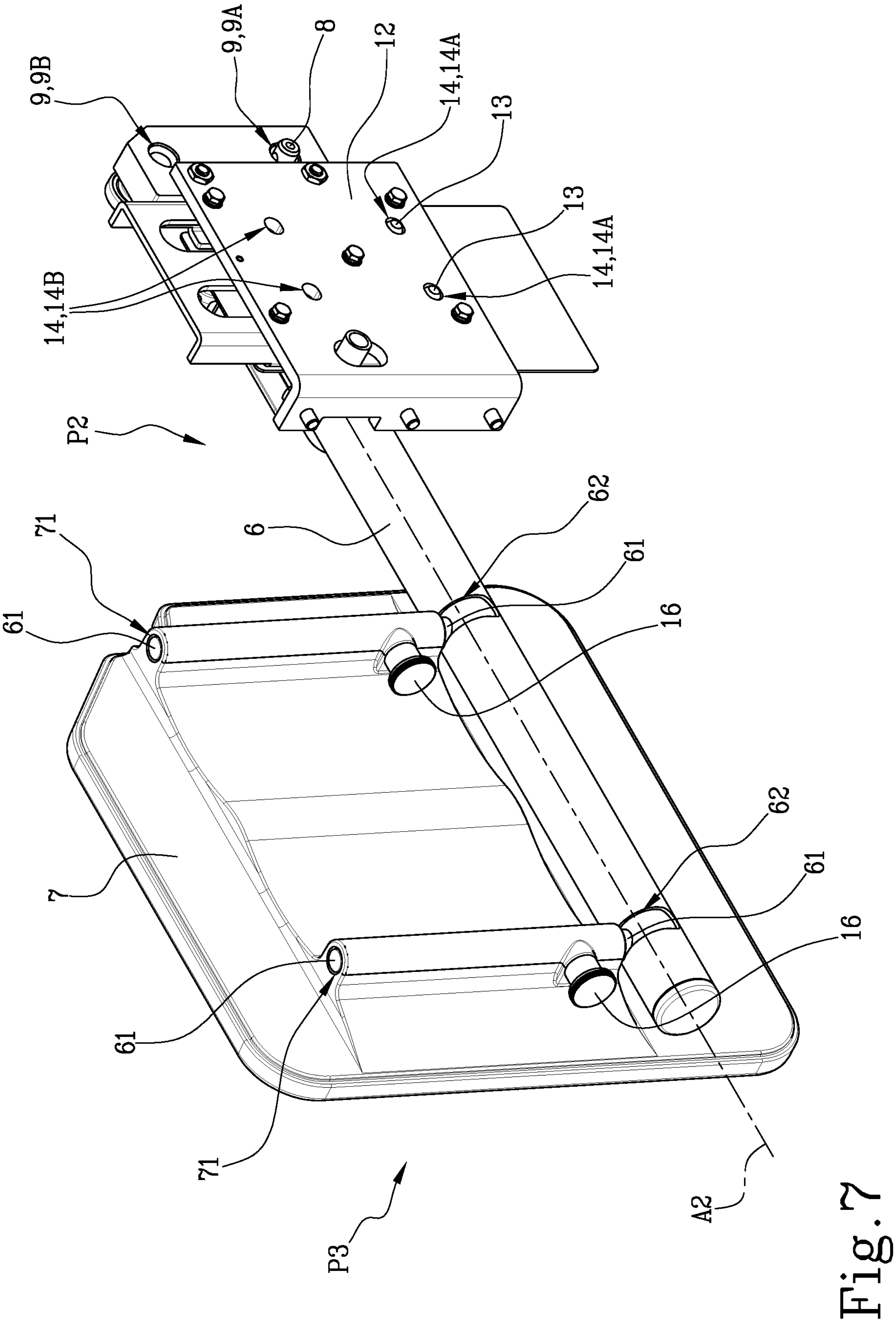
FIG. 7 shows a different schematic perspective view of the detail of FIGS. 3, 4, 5 and 6.

In other words, the pin 8 can be inserted into the first hole 9A, as illustrated in FIG. 5, or into the second hole 9B, as illustrated in FIG. 6.

Advantageously, disposing the first and the second hole (9A, 9B) at different heights allows coupling the supporting rod 6 of the frame 2 at different heights, depending on need. It follows that the shelf 7 can also be positioned at different heights.

According to an aspect of the disclosure, the frame 2 comprises one or more reinforcing elements 23 disposed at least at the portions of the frame 2 adjacent to each hole (9, 9A, 9B).

For greater clarity, at the perimeter and portions in proximity to each hole (9, 9A, 9B), the frame 2 is reinforced, for example by a plate, a bracket or the like, to make the frame 2 thicker and more resistant to forces applied to it.

Advantageously, this allows the pin 8 to not deform the holes (9, 9A, 9B) and/or the frame 2 in the event of stress caused by the rotation of the supporting rod 6 or the weight of the supporting rod itself or a weight on the shelf 7.

In a preferred embodiment, the machine 1 comprises an elastically deformable housing 10, configured, when the supporting rod 6 is inserted into it, to deform and to lock the supporting rod 6 at the rest position P1.

Preferably, the elastically deformable housing 10 is made from metallic material.

Advantageously, the elastically deformable housing 10 stops the supporting rod 6 from rotating accidentally, that is, without the operator turning it to disengage the supporting rod 6 from the elastically deformable housing 10.

In an embodiment, the machine 1 comprises a support block 11 configured to lock the supporting rod 6 at the operatively active position P2.

Advantageously, the support block 11 stops the supporting rod 6 from rotating accidentally, that is, without the operator turning it to disengage the supporting rod 6 from the support block 11.

According to an aspect of the disclosure, the elastically deformable housing 10 is attached to the support block 11.

Preferably, the support block 11 is made from plastic material.

According to an aspect of the disclosure, the machine 1 comprises a fastening block 12 fixed to the frame 2 and fastening elements 13 fixed to the support block 11. The support block 11 is configured to be coupled to the fastening block 12 by the fastening elements 13.

The fastening elements 13 may comprise, for example, bushings, bolts, nuts and the like.

The fastening elements 13 may comprise elastic elements, not illustrated in the accompanying drawings, used to exert on the support block 11 a tractive force which pulls it towards the frame 2.

Preferably, the fastening block 12 is located inside the frame 2.

According to an aspect of the disclosure, the fastening block 12 has at least one pair of cavities (14, 14A, 14B).

Each cavity (14, 14A, 14B) is configured to receive a respective fastening element 13.

In other words, each fastening element 13 can be inserted into a cavity (14, 14A, 14B) of the fastening block 12.

In a preferred embodiment, the fastening block 12 has a first pair of cavities 14A and a second pair of cavities 14B.

The first and the second pair of cavities (14A, 14B) are configured to selectively receive a pair of fastening elements 13. In other words, a pair of fastening elements 13 can be inserted into the cavities 14 of the first pair of cavities 14A or of the second pair of cavities 14B.

The first and the second pair of cavities (14A, 14B) are disposed respectively at a first height and at a second height, the second height being greater than the first height.

Advantageously, the first and the second pair of cavities (14A, 14B) being disposed at different heights allow coupling the support block 11 to the fastening block 12 hence to the frame 2, at different heights according to need.

Preferably, the difference between the heights at which the first and the second pair of cavities (14A, 14B) are disposed is the same as the difference between the heights at which the first and the second hole (9A, 9B) are disposed.

Advantageously, this allows changing both the hole (9A, 9B) into which the pin 8 is inserted and the pair of cavities (14A, 14B) into which the pair of fastening elements 13 are inserted without altering the above described features.

According to an aspect of the disclosure, the fastening block 12 comprises guides 17 adapted to allow the pair of fastening elements 13 to be moved between the first pair of cavities 14A and the second pair of cavities 14B.

Preferably, the guides 17 are defined by a slot or a pair of slots.

According to an aspect of the disclosure, the frame 2 has an opening 24 at a portion of the fastening block 12.

In other words, the fastening block 12 is located inside the frame 2 and attached thereto and the frame 2 has openings 24 on the lateral wall 22 where the at least one portion of the fastening block 12 is located.

The opening 24 is configured to allow the pair of fastening elements 13 to be moved between the first pair of cavities 14A and the second pair of cavities 14B.

For greater clarity of description, the fastening block 12 is preferably located inside the frame 2 and thus the fastening elements 13 pass through the frame 2 to couple the support bock 11 to the fastening block 12. Thus, the opening 24 allows moving the pair of fastening elements 13 between the first pair of cavities 14A and the second pair of cavities 14B of the fastening block 12.

According to an aspect of the disclosure, the machine 1 comprises a closing wall 15 which closes the lateral wall 22 of the frame 2 and which is attached to the support block 11. The closing wall 15 is located on the inside of, and in contact with, the frame 2 at the opening 24 so as to close the opening 24 itself.

The closing wall 15 is configured to obstruct the passage from the outside to the inside of the frame 2 through the opening 24.

Advantageously, the closing wall 15 allows keeping dust and dirt out of the frame 2, while allowing the fastening elements 13 to move as described above.

It should be noted that the closing wall 15, being attached to the support block 11, is movable relative to the frame 2.

Preferably, the closing wall 15 is a panel or plate.

According to an aspect of the disclosure, the support block 11 comprises a grip 11A jutting from the lateral wall 22 of the frame 2.

In a preferred embodiment, the support block 11 is movable relative to the frame 2 when the grip 11A is pulled.

In other words, the grip 11A allows an operator to move the support block 11, and the fastening elements 13 attached thereto, relative to the frame 2.

Advantageously, the grip 11A makes it easier to move the fastening elements 13 between the pairs of cavities (14A, 14B) at the different heights.

According to an aspect of the disclosure, the machine 1 comprises one or more supporting arms 61 for supporting the shelf 7 and movably attached to the supporting rod 6.

Each supporting arm 61 is movable in rotation about the longitudinal axis A2 of the supporting rod 6.

In a preferred embodiment, the supporting rod 6 is provided with a slot 62 for each supporting arm 61.

Each slot 62 is configured to allow rotating the respective supporting arm 61 about the longitudinal axis A2 of the supporting rod 6.

According to an aspect of the disclosure, the shelf 7 comprises one or more hollow portions 71.

Each supporting arm 61 of the supporting rod 6 is configured to be inserted into the respective hollow portion 71 of the shelf 7.

In a preferred embodiment, the machine 1 comprises one or more screws 16.

Each screw 16 is configured to movably lock the supporting arm 61 of the supporting rod 6 to couple it to the respective hollow portion 71 of the shelf 7.

For greater clarity, the screws 16 attach the shelf 7 to the supporting arms 61.

In other words, the supporting arms 61 and the shelf 7 are coupled to each other and, via the screws 16, can rotate as one about the longitudinal axis A2 of the supporting rod 6.

Advantageously, the supporting arms 61 allow the shelf 7 to support the load resting on it and/or increase the maximum load supportable by the shelf 7.

It should be noted that undoing the screws 16 allows the shelf 7 to be uncoupled from the supporting arms 61.

Advantageously, uncoupling the shelf 7 facilitates cleaning, maintenance or replacement of the shelf 7, when necessary.

According to an aspect, the shelf 7 defines a supporting top S.

Preferably, when the shelf 7 is at the inoperative position P3, the supporting top S is positioned parallel to the vertical and when the shelf 7 is at the operative position P4, the supporting top S is positioned perpendicularly to the vertical.

In a preferred embodiment, when the shelf 7 is at the operative position P4, the supporting top is positioned under the dispenser 5.

In an embodiment, the machine 1 comprises an additional container 30, an additional stirrer 40 mounted inside the additional container 30 and an additional dispenser 50.

According to an aspect of this disclosure, the machine 1 comprises an additional motor 103, configured to set the additional stirrer 40 in rotation about its axis of rotation.

The control unit U is configured to drive the motor 103.

According to an aspect of this disclosure, the machine 1 comprises a hopper 60 attached to the outside of the frame 2 and positioned under the dispenser 5 to feed the additional container 30 with the product to be processed extracted through the dispenser 5.

Preferably, the additional container 30 is configured to cool the product being processed.

According to an aspect of this disclosure, the thermal treatment system 100 is operatively connected to the additional container 30 to cool the walls thereof.

In other words, the additional container 30 is connected to the thermal treatment system 100, which allows the product inside the additional container 30 to be cooled while it is simultaneously being stirred by the additional stirrer 40.

Preferably, the thermal treatment system 100 is configured to cool the product inside the additional container 30 to a temperature of between 0° C. and −15° C., more preferably between −3° C. and −10° C.

It should be noted that the additional container 30 advantageously allows making ice cream products, for example, gelati or cold dessert products.

In this regard, the base product may first be treated—pasteurized, for example—in the container 3 and then extracted through the dispenser 5 and, by way of the hopper 60, fed into the additional container 30 for processing.

According to an aspect, the machine 1 comprises a ledge 70 attached to the front wall 21 of the frame 2. The ledge 70 is located under the additional dispenser 50.

The ledge 70 is fixed and is configured to support a load such as, for example, a container to be filled with processed product dispensed through the additional dispenser 50.

According to an aspect of this disclosure, the dispenser 5 is movable in rotation about an axis A3 perpendicular to the vertical.

The dispenser 5 comprises a dispensing mouth 51.

The dispenser 5 is movable in rotation between a first position P5 (illustrated by the solid line in FIG. 1), where the dispensing mouth 51 is disposed vertically over the hopper 60, and a second position P6 (illustrated by the dashed line in FIG. 1), where the dispensing mouth 51 is disposed vertically completely outside the hopper 60.

In other words, when dispensing the product through the dispenser 5 at the first position P5, the product falls into the hopper 60 by gravity; when dispensing the product through the dispenser 5 at the second position P6, the product falls outside the hopper 60 by gravity.

In a preferred embodiment, when the shelf 7 is at the operative position P4, the dispensing mouth 51 of the dispenser 5 at the second position P6 is disposed vertically over the shelf 7.

In other words, when dispensing the product through the dispenser 5 at the second position P6, the product falls by gravity onto the supporting top S of the shelf 7. It should be noted that if a container is placed on the shelf 7, dispensing the product means filling the product into that container and, thanks to the features described above, the shelf 7 is able to support that load.

The invention claimed is:

1. A machine for processing liquid or semi-liquid food products, comprising:

a frame comprising at least a front wall and a lateral wall;

at least one container for containing a product to be processed;

a stirrer mounted inside the container;

a thermal treatment system, operatively connected to the container to heat the walls thereof;

a dispenser connected to the container to allow extracting the product to be processed, the dispenser being mounted on the front wall of the frame;

a supporting rod, having a longitudinal axis, coupled to the lateral wall of the frame and movable in rotation about an axis perpendicular to the lateral wall, between a rest position and an operatively active position;

a shelf rotatably coupled to the supporting rod, the supporting rod being configured to support the shelf, the shelf being movable in rotation about the longitudinal axis of the supporting rod between an inoperative position and an operative position.

2. The machine according to claim 1, wherein the supporting rod is configured:

when at the rest position, to position the shelf to face the lateral wall of the frame;

when at the operatively active position, to position the shelf to face a region of space in front of the front wall of the frame.

3. The machine according to claim 1, and further comprising a pin; the supporting rod being movable in rotation about the pin between the rest position and the operatively active position.

4. The machine according to claim 3, wherein the lateral wall of the frame has at least one hole for receiving the pin.

5. The machine according to claim 3, wherein the frame comprises a first hole and a second hole, the first and the second hole being configured for selectively receiving the pin and being disposed respectively at a first height and at a second height, the second height being greater than the first height.

6. The machine according to claim 4, wherein the frame comprises one or more reinforcing elements disposed at least at portions of the frame adjacent to each hole.

7. The machine according to claim 1, and further comprising an elastically deformable housing, configured, when the supporting rod is inserted into the elastically deformable housing, to deform and to lock the supporting rod at the rest position.

8. The machine according to claim 7, wherein the elastically deformable housing is made from metallic material.

9. The machine according to claim 1, and further comprising a support block configured to lock the supporting rod at the operatively active position.

10. The machine according to claim 9, wherein the elastically deformable housing is attached to the support block.

11. The machine according to claim 9, wherein the support block is made from plastic material.

12. The machine according to claim 9, and further comprising a fastening block attached to the frame and fastening elements attached to the support block, the support block being configured to be coupled to the fastening block by the fastening elements.

13. The machine according to claim 12, wherein the fastening block has at least one pair of cavities, each cavity being configured to receive a respective fastening element.

14. The machine according to claim 13, wherein the fastening block has a first pair of cavities and a second pair of cavities, the first and the second pair of cavities are configured to selectively receive a pair of fastening elements, the first and the second pair of cavities being disposed respectively at a first height and at a second height, where the second height is greater than the first height.

15. The machine according to claim 14, wherein the fastening block comprises guides, the pair of fastening elements being movable, via the guides, between the first pair of cavities and the second pair of cavities.

16. The machine according to claim 15, wherein the frame has an opening at a portion of the fastening block, the opening being configured to allow the pair of fastening elements to be moved between the first pair of cavities and the second pair of cavities.

17. The machine according to claim 16, and further comprising a closing wall which closes the lateral wall of the frame and which is attached to the support block, the closing wall being located on the inside of, and in contact with, the frame at the opening so as to close the opening itself.

18. The machine according to claim 9, wherein the support block comprises a grip jutting from the lateral wall of the frame.

19. The machine according to claim 18, wherein the support block is movable relative to the frame when the grip is pulled.

20. The machine according to claim 1, and further comprising one or more supporting arms for supporting the shelf and movably attached to the supporting rod.

21. The machine according to claim 20, wherein each of the one or more supporting arms is movable in rotation about the longitudinal axis of the supporting rod.

22. The machine according to claim 21, wherein the supporting rod includes a slot for each of the one or more supporting arms, with each slot being configured to allow rotating the respective supporting arm about the longitudinal axis of the supporting rod.

23. The machine according to claim 20, wherein the shelf comprises one or more hollow portions, each supporting arm of the supporting rod being configured to be inserted into a respective one of the one or more hollow portions.

24. The machine according to claim 23, and further comprising one or more screws, each of the one or more screws being configured to movably lock the one or more supporting arms of the supporting rod to couple the one or more supporting arms to a respective one of the one or more hollow portions of the shelf.

25. The machine according to claim 1, wherein the shelf defines a supporting top.

26. The machine according to claim 25, wherein, when the shelf is at the inoperative position, the supporting top is positioned parallel to a vertical and wherein, when the shelf is at the operative position, the supporting top is positioned perpendicularly to the vertical.

27. The machine according to claim 26, wherein, when the shelf is at the operative position, the supporting top is positioned under the dispenser.

28. The machine according to claim 1, and further comprising an additional container, an additional stirrer mounted inside the additional container and an additional dispenser.

29. The machine according to claim 28, and further comprising a hopper attached to an exterior of the frame and positioned under the dispenser to feed the additional container with the product to be processed extracted through the dispenser.

30. The machine according to claim 28, wherein the thermal treatment system is operatively connected to the additional container to cool walls thereof.

31. The machine according to claim 28, and further comprising a ledge attached to the front wall of the frame, the ledge being located under the additional dispenser.

32. The machine according to claim 1, wherein the dispenser is movable in rotation about an axis perpendicular to a vertical.

33. The machine according to claim 29, wherein the dispenser comprises a dispensing mouth, the dispenser being movable in rotation between a first position, where the dispensing mouth is disposed vertically over the hopper, and a second position, where the dispensing mouth is disposed vertically completely outside the hopper.

34. The machine according to claim 33, wherein, when the shelf is at the operative position, the dispensing mouth of the dispenser at the second position is disposed vertically over the shelf.

* * * * *